Sept. 7, 1965  W. S. ROUVEROL  3,204,476
VARIABLE SPEED TRANSMISSION
Filed April 5, 1960  10 Sheets-Sheet 1
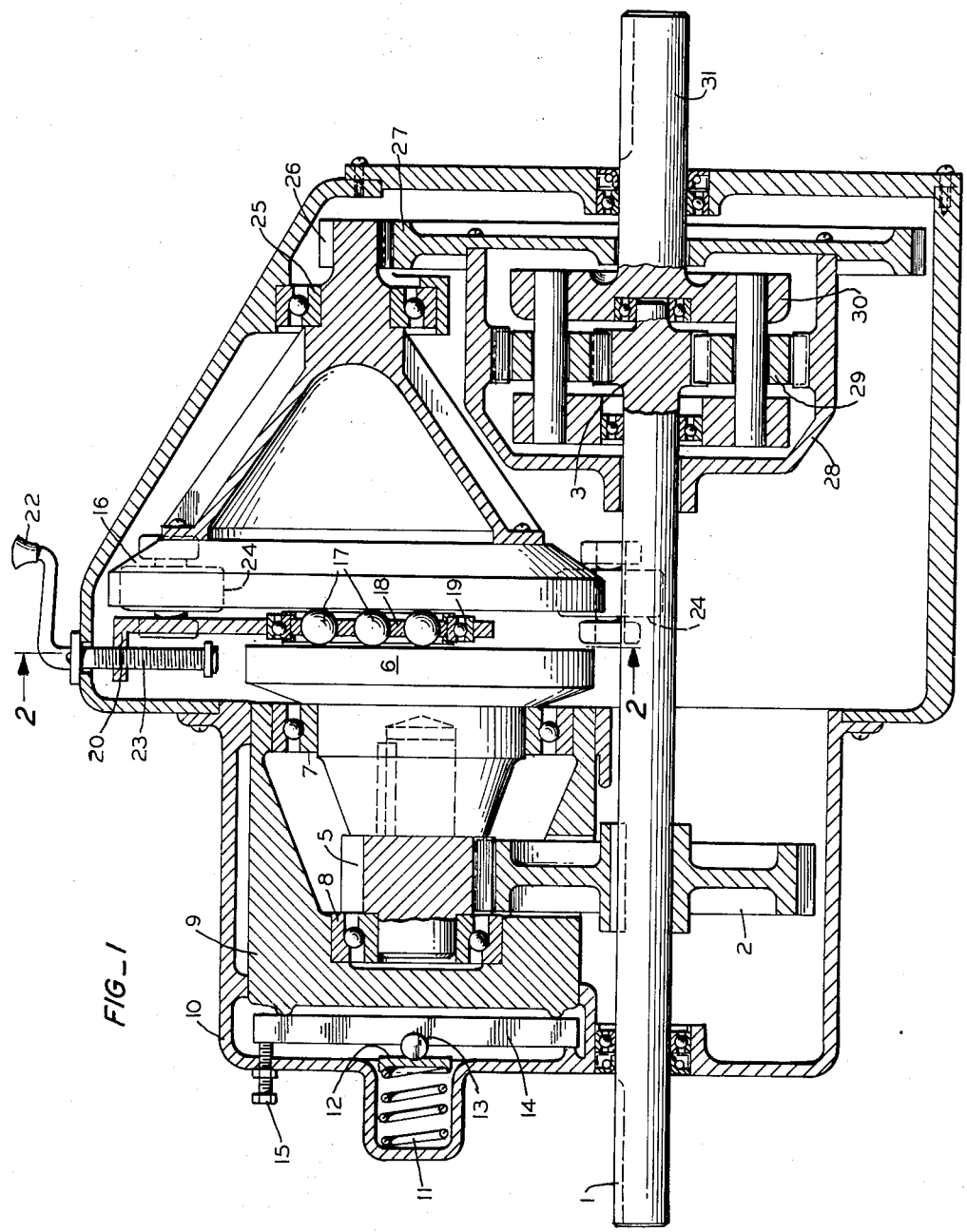
FIG_1
INVENTOR.
WILLIAM S. ROUVEROL
BY
Boyken, Mobler + Wood
ATTORNEYS Sept. 7, 1965  W. S. ROUVEROL  3,204,476
VARIABLE SPEED TRANSMISSION
Filed April 5, 1960  10 Sheets-Sheet 2
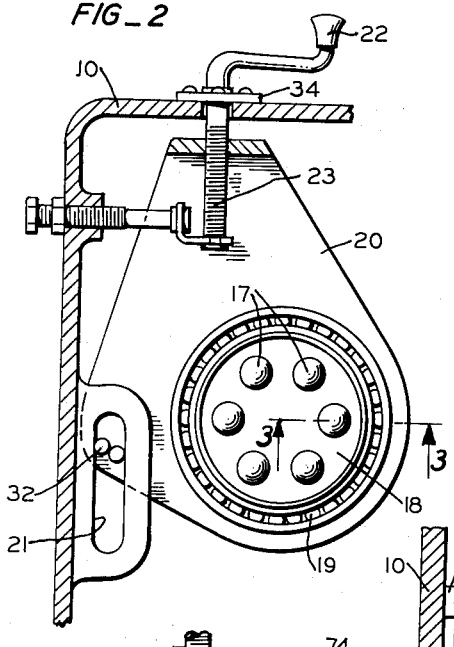
FIG_2
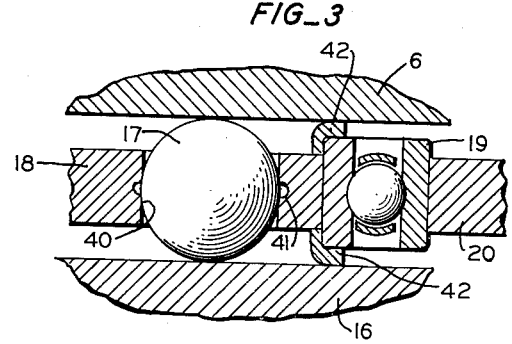
FIG_3
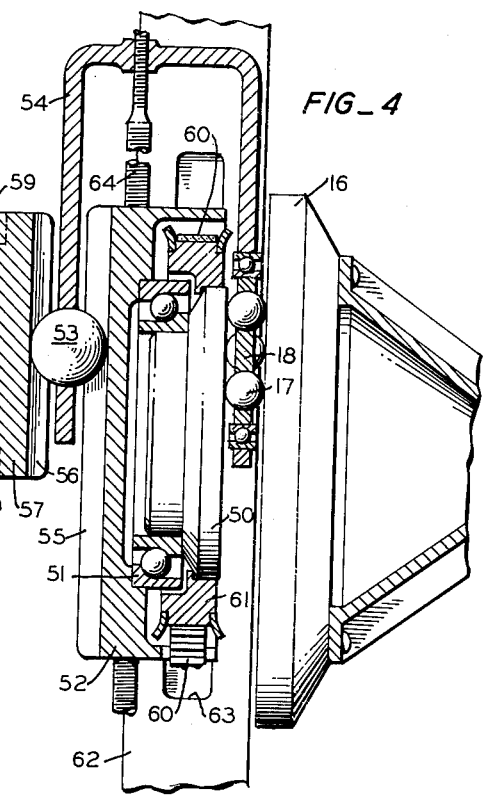
FIG_4
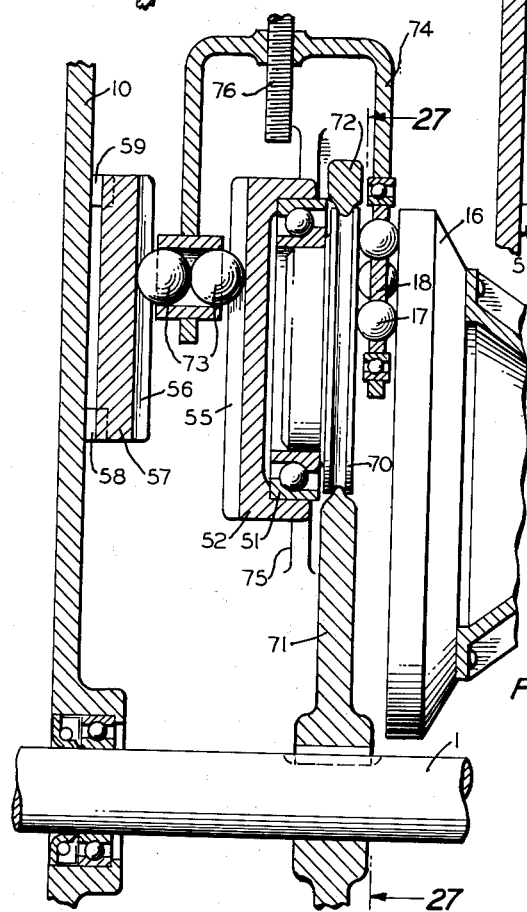
FIG_5
INVENTOR.
WILLIAM S. ROUVEROL
BY
Boyken, Mobler & Wood
ATTORNEYS Sept. 7, 1965 W. S. ROUVEROL 3,204,476
VARIABLE SPEED TRANSMISSION
Filed April 5, 1960 10 Sheets-Sheet 3
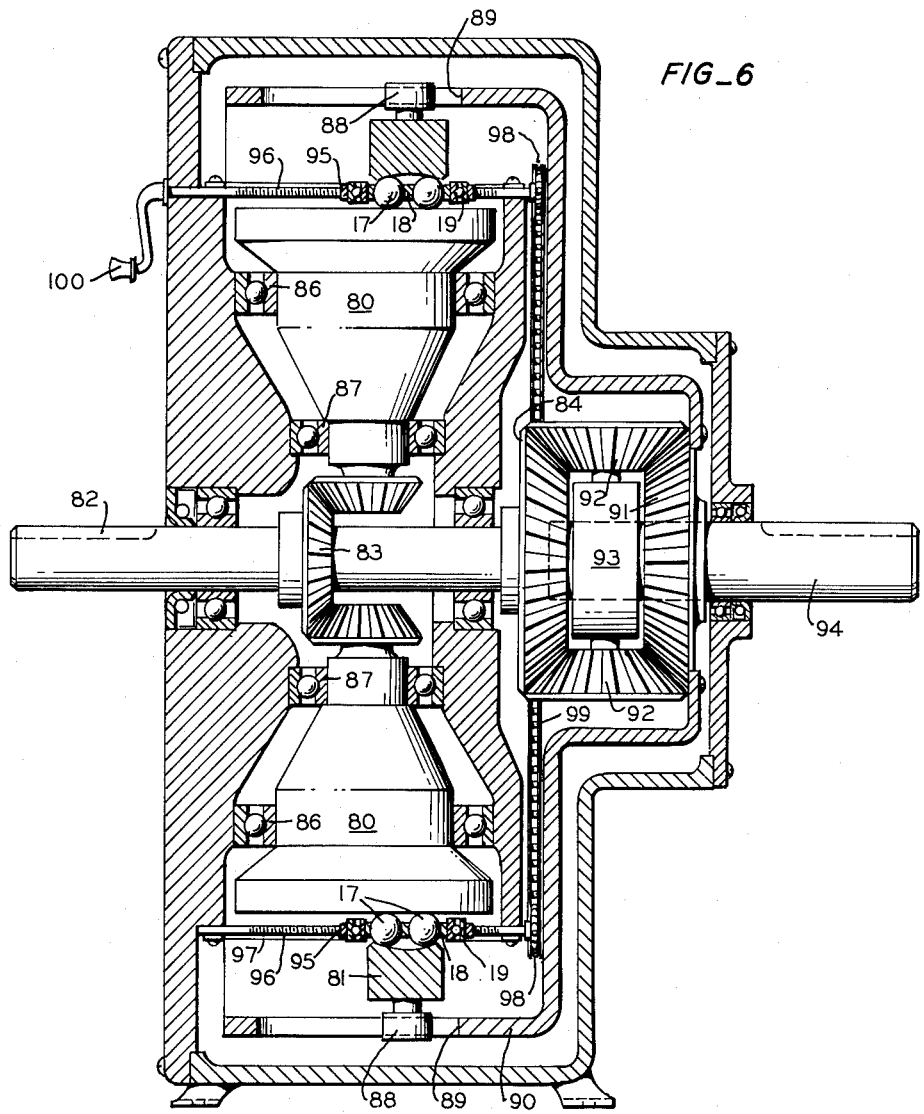
FIG_6
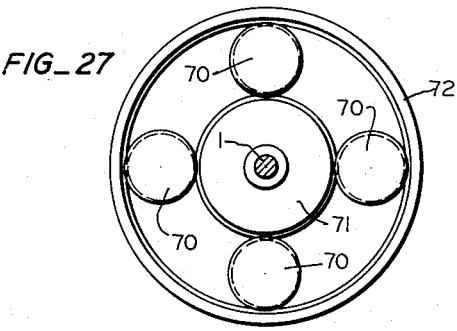
FIG_27
INVENTOR.
WILLIAM S. ROUVEROL
BY
Boyken, Mohler & Wood
ATTORNEYS

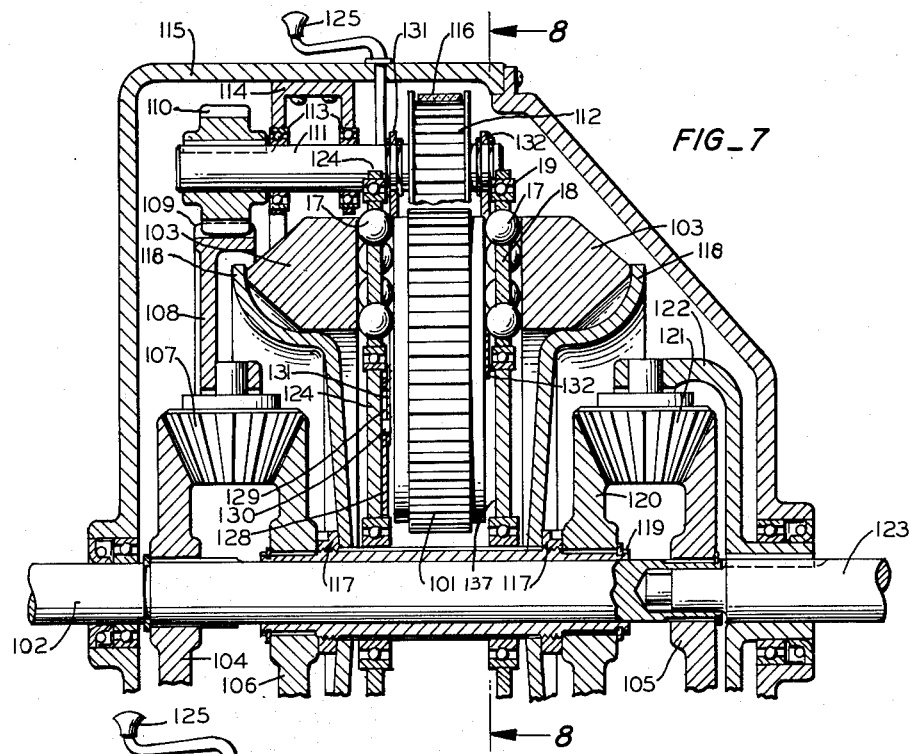

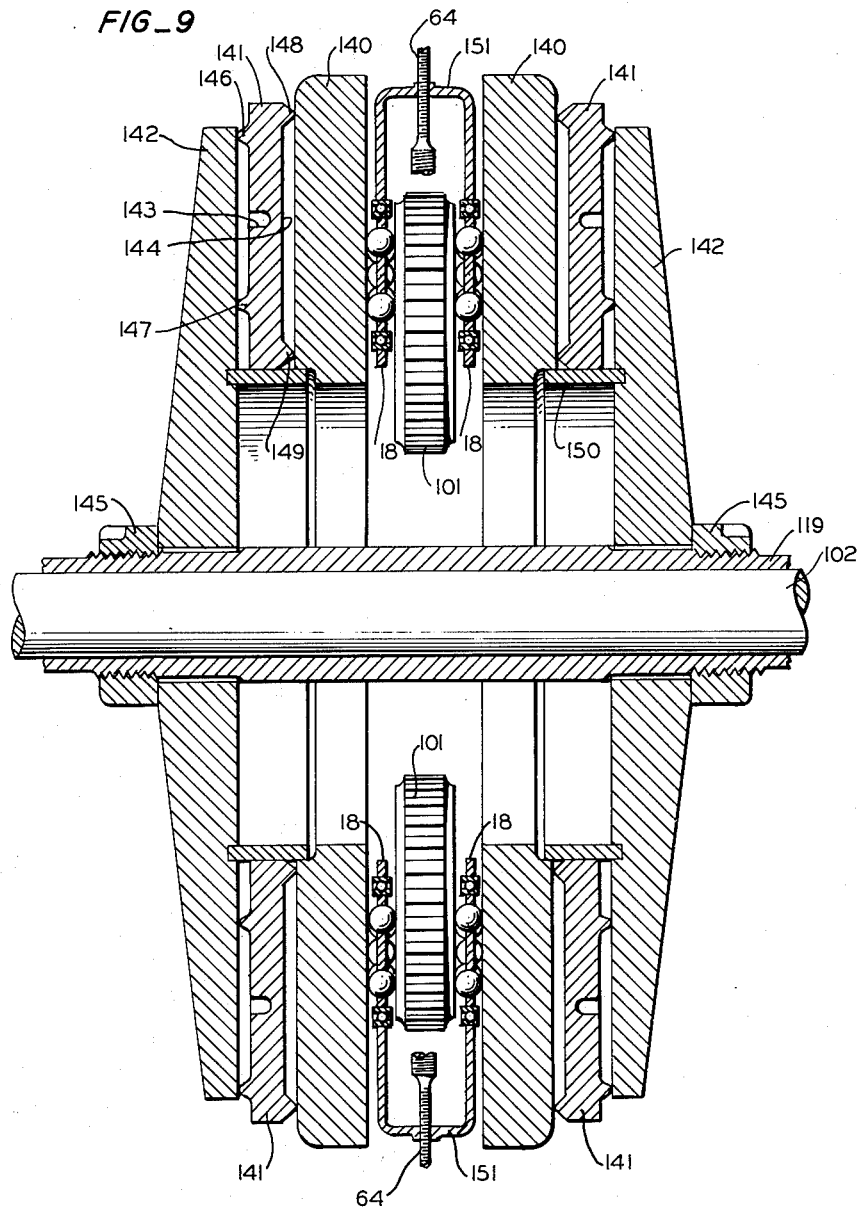

Sept. 7, 1965  W. S. ROUVEROL  3,204,476
VARIABLE SPEED TRANSMISSION
Filed April 5, 1960  10 Sheets-Sheet 6
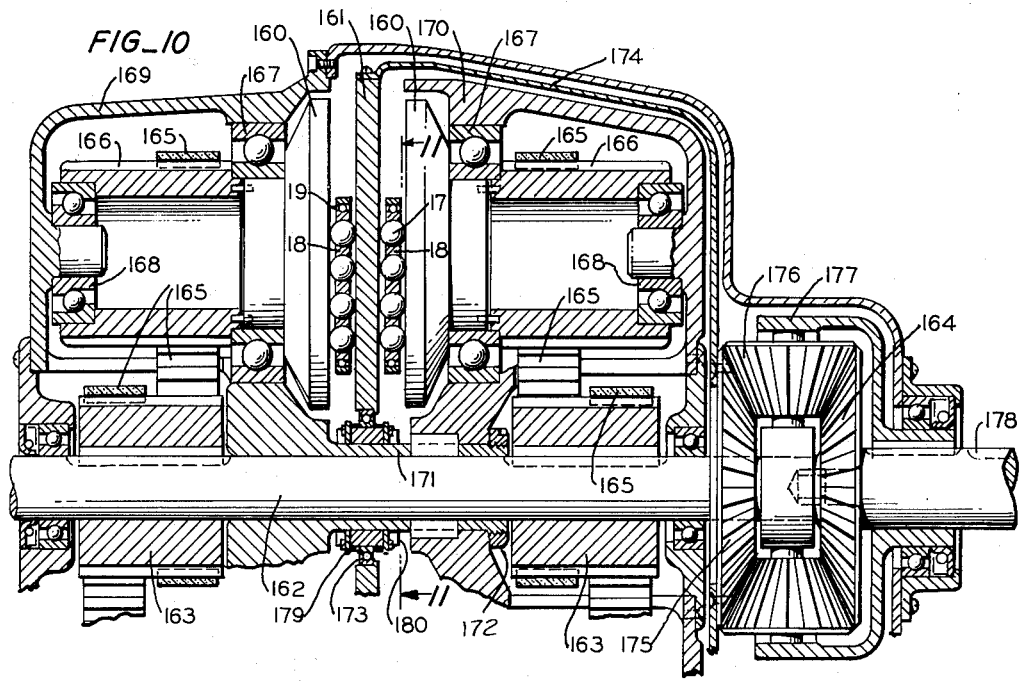
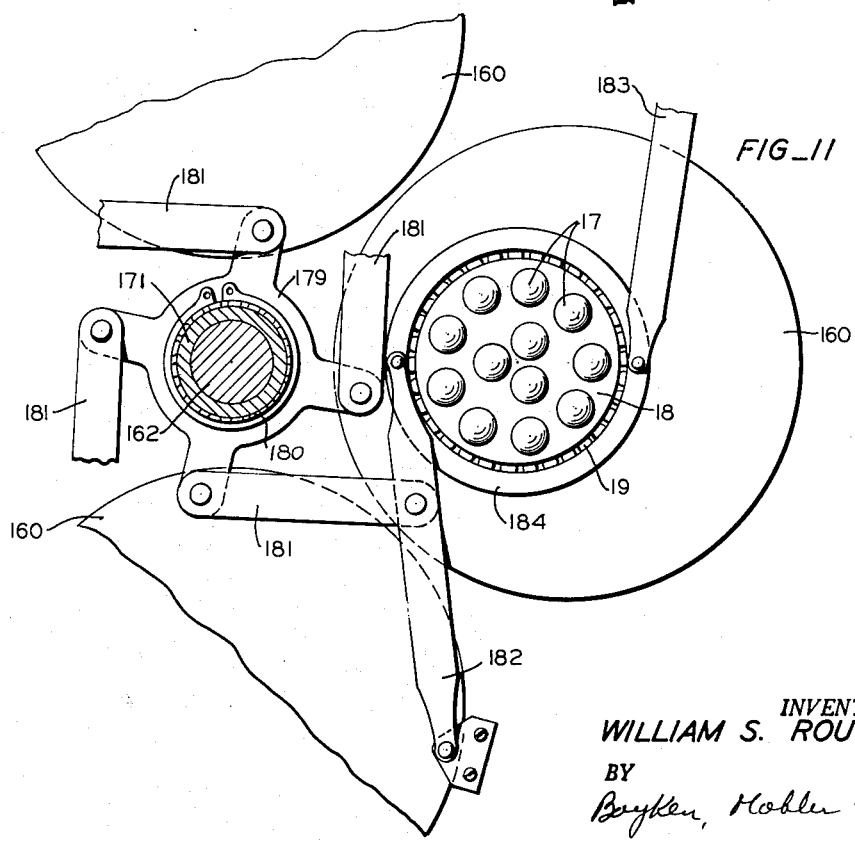
INVENTOR.
WILLIAM S. ROUVEROL
BY
Boyken, Mobler & Wood
ATTORNEYS

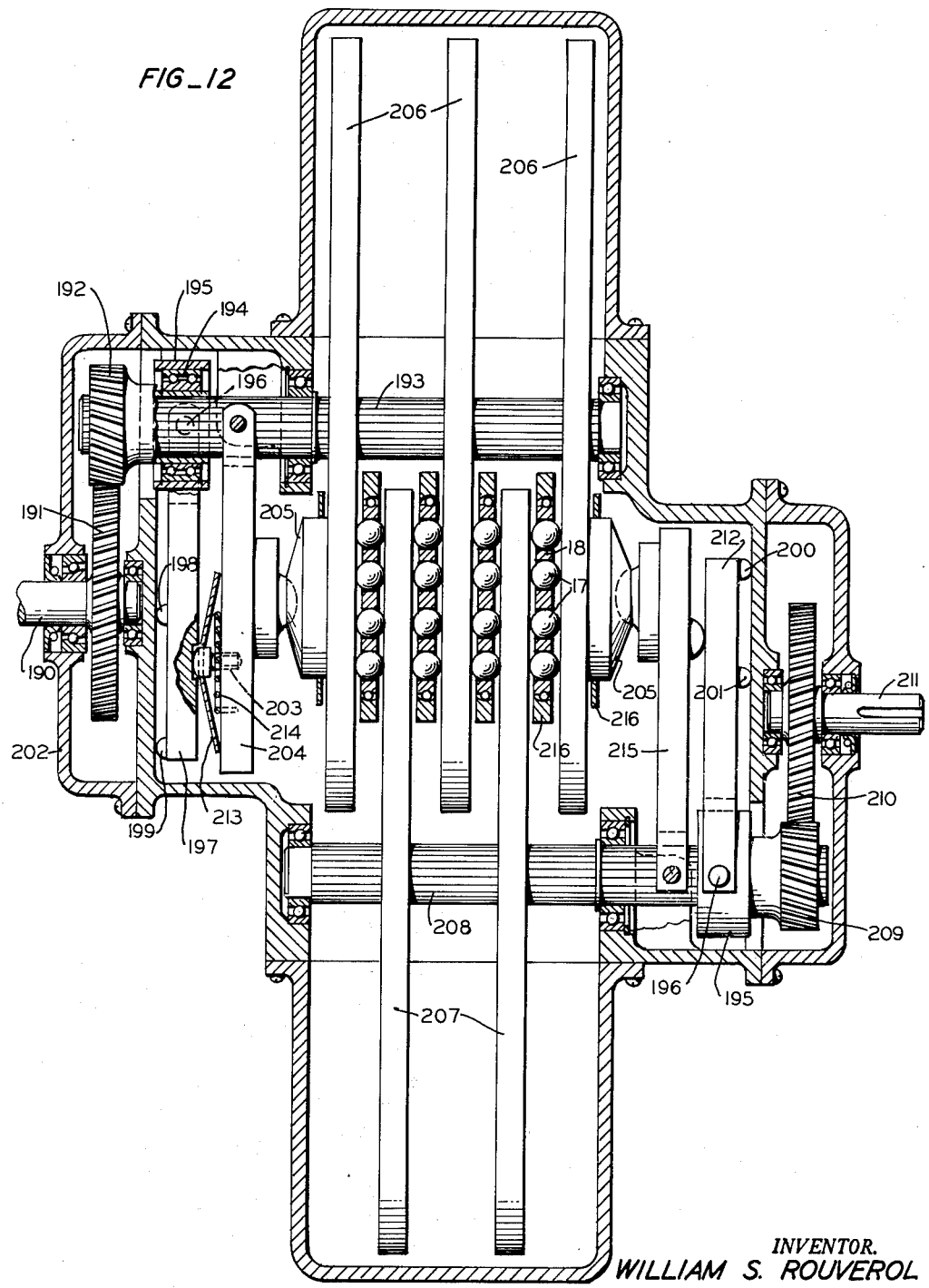

Sept. 7, 1965 W. S. ROUVEROL 3,204,476
VARIABLE SPEED TRANSMISSION
Filed April 5, 1960 10 Sheets-Sheet 8
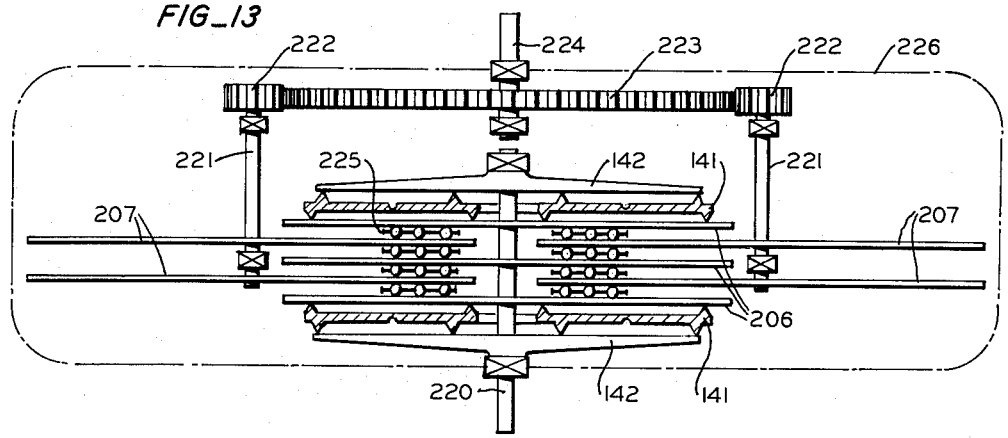
FIG_13
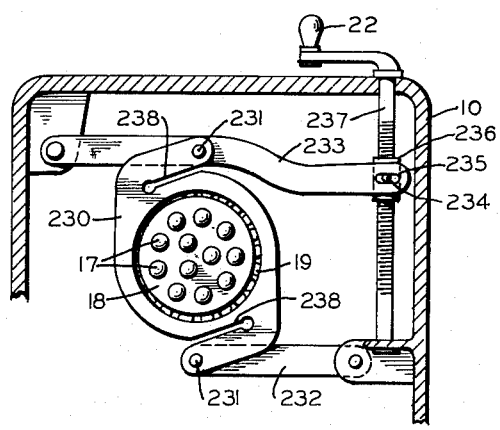
FIG_14
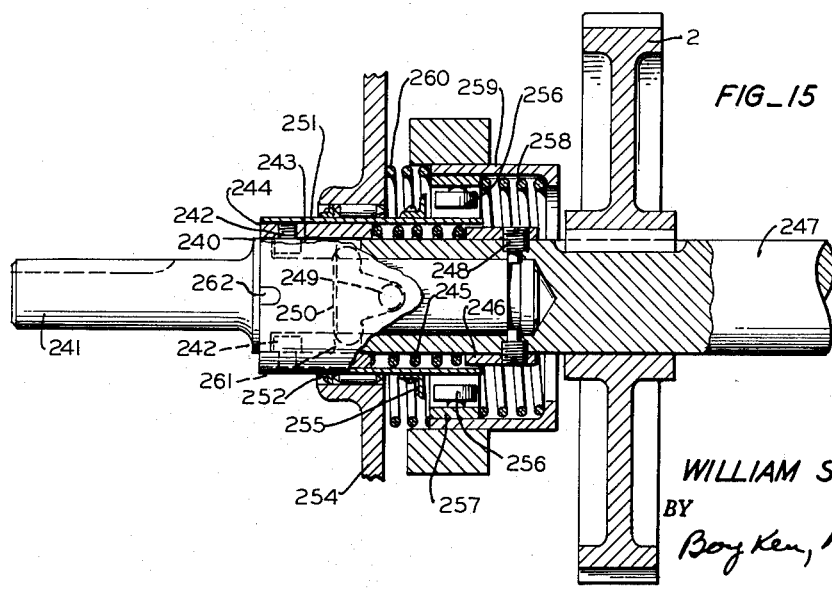
FIG_15
INVENTOR.
WILLIAM S. ROUVEROL
BY
Boyken, Mobler & Wood
ATTORNEYS Sept. 7, 1965 W. S. ROUVEROL 3,204,476
VARIABLE SPEED TRANSMISSION
Filed April 5, 1960 10 Sheets-Sheet 9
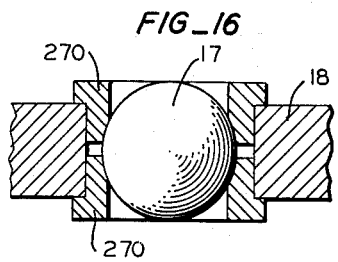
FIG_16
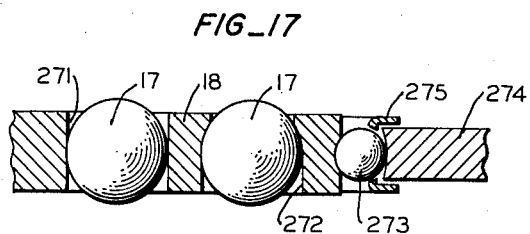
FIG_17
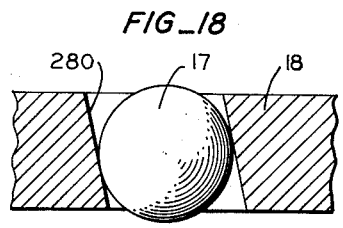
FIG_18
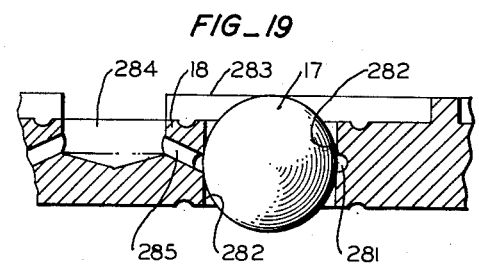
FIG_19
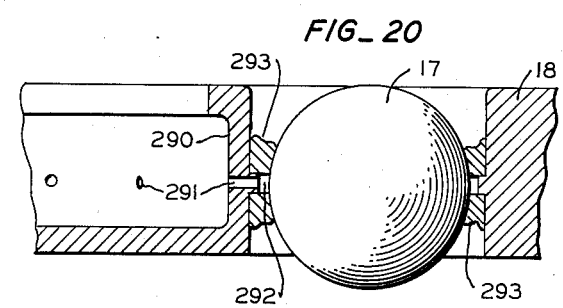
FIG_20
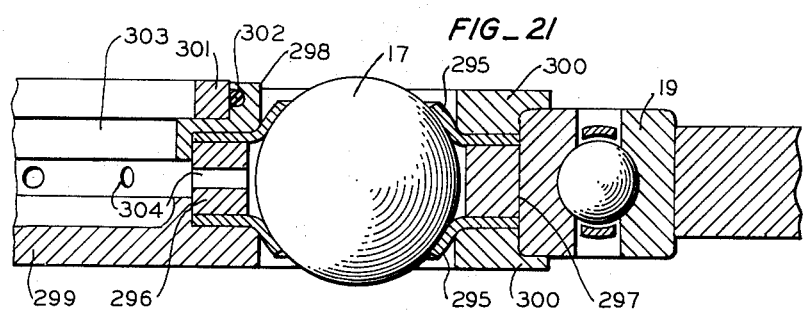
FIG_21
INVENTOR.
WILLIAM S. ROUVEROL
BY
Berghen, Hobler + Wood
ATTORNEYS Sept. 7, 1965 W. S. ROUVEROL 3,204,476
VARIABLE SPEED TRANSMISSION
Filed April 5, 1960 10 Sheets-Sheet 10
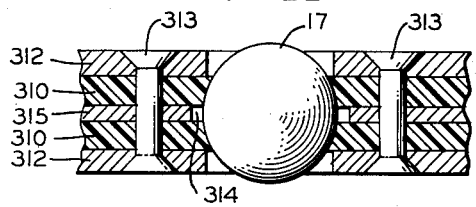
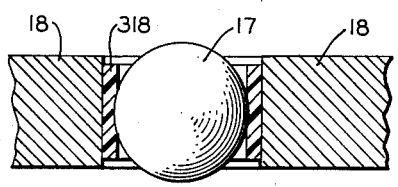
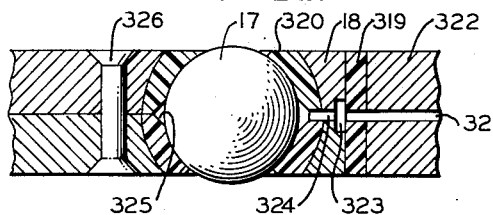
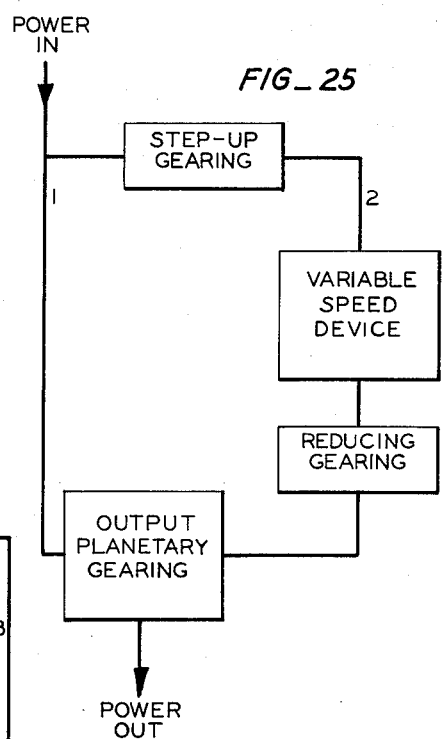
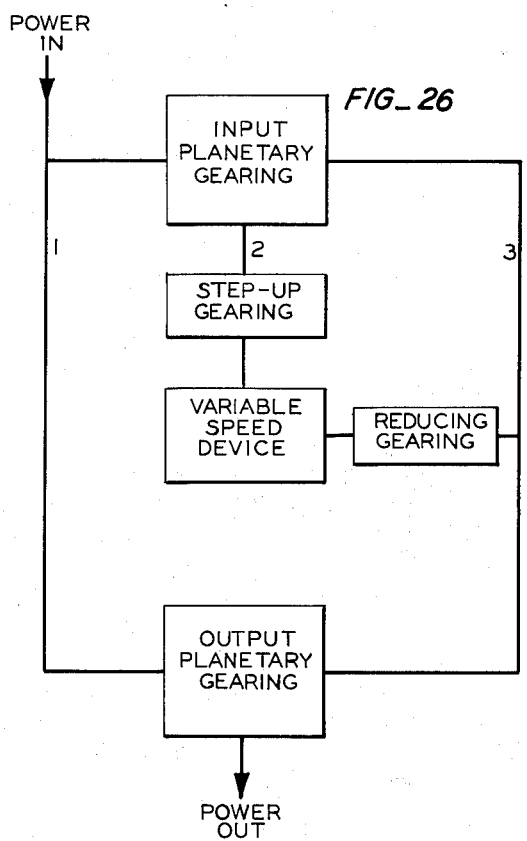
INVENTOR.
WILLIAM S. ROUVEROL
BY
Boyken, Mobler + Wood
ATTORNEYS

# United States Patent Office 3,204,476
Patented Sept. 7, 1965

3,204,476
VARIABLE SPEED TRANSMISSION
William S. Rouverol, 2120 Haste St., Berkeley, Calif.
Filed Apr. 5, 1960, Ser. No. 20,081
52 Claims. (Cl. 74—198)

This invention relates to improvements in variable speed friction transmissions. In particular it relates to means for increasing the power capacity of multiple-ball transmissions such as shown in United States patent application Serial Number 611,485, now Patent No. 2,951,384.

Since the power capacity of any friction transmission is dependent on the product of tractive force times rolling velocity, designing to achieve maximum capacity requires that both of these factors be maximized. This maximization is contributed to by the following:

(1) Applying to all balls a normal load which induces stresses slightly less than the fatigue limit of the disk and ball materials, and applying it in such a way that it falls equally on all balls.

(2) Reducing the torque imposed on the variable speed device by utilizing epicyclic or differential gearing to by-pass most of the input power, in effect exchanging the very wide range of speed variation of the multiple-ball transmission for increased torque output.

(3) Providing a cage mounting which will keep the cage axis as close as possible to the plane of the disk axes, in order to minimize components of tractive force which are parallel to that plane and hence non-useful for transmitting torque.

(4) Providing a gearing system which will impose torque on the variable speed device in exact proportion to cage offset and hence in exact proportion to its ability to carry torque.

(5) Providing a gearing system, a cage construction, and a disk mounting that will permit operation at the highest possible speed.

The primary object of the invention is to increase the power capacity of the multiple-ball type of transmission by devising constructions which will embody as many of these five foregoing characteristics as may be practicable for a particular application. A further object of the invention is to do this in such a way as to retain the fundamental advantages of the multiple-ball transmission, which include compactness, reliability, low manufacturing cost, high efficiency and long wear-life.

Constructions disclosed in the drawings accomplish these objectives in a variety of ways and may be divided into three basic species:

(1) Machines with one or more pairs of small, high-speed disks, as in FIGS. 1, 4, and 5.

(2) Machines with two or more small high-speed disks cooperating to drive at least one larger disk, as in FIGS. 6, 7, 9, and 10.

(3) Machines employing several thin disks mounted on central shafts, as in FIGS. 12 and 13.

Referring to the drawings:

FIG. 1 is a sectional elevation showing a transmission of the first type, with by-pass gearing.

FIG. 2 is an interior detail of FIG. 1 showing one type of mounting of the cage.

FIG. 3 is an enlarged sectional detail of FIG. 2 showing one type of construction of the ball seats in the cage.

FIG. 4 is a partial sectional elevation of a transmission similar to FIG. 1, but with provision for shifting the driving disk twice as far as the cage shifts.

FIG. 5 is a similar view of another transmission similar to FIG. 1 but with a different method of mounting the driving disks.

FIG. 6 is a sectional elevation of a transmission of the second type, with by-pass gearing.

FIG. 7 is a similar view of a transmission similar to FIG. 6 but with both driving and driven disks being flat.

FIG. 8 is a partial sectional elevation through FIG. 7, showing the method of mounting the driving disks.

FIG. 9 is a similar view of a transmission similar to FIG. 8, but with a wider driven disk mounted so as to remain plane as the cages are moved radially.

FIG. 10 is a similar view of still another transmission of the second type, with by-pass gearing and a shroud to transmit power from the driven disk.

FIG. 11 is a sectional detail of the transmission of FIG. 10, showing a method of mounting and shifting the cages.

FIG. 12 is a sectional plan view of a transmission of the third type, with input and output gearing and torque-proportional loading on the cages.

FIG. 13 is a semi-schematic plan view of a transmission of the same type as FIG. 12, but with a loading system for the cages similar to that of FIG. 9.

FIG. 14 is a sectional detail showing an alternative to the method of cage mounting of FIG. 2.

FIG. 15 is a sectional detail of a combination torque-proportional loading system and overload release clutch for use with friction transmissions such as those illustrated.

FIGS. 16 through 24 show partial sectional details of modifications of FIG. 3.

FIG. 25 is a block diagram of a transmission employing one set of by-pass gearing.

FIG. 26 is a block diagram of a transmission employing two sets of by-pass gearing.

FIG. 27 is a cross section taken along lines 27—27 of FIG. 5.

In detail, and referring to FIG. 1, torque and/or angular motion is applied to input shaft 1 which transmits it in part to a driving gear 2 and in part to the sun gear 3 of an epicyclic gear set. Driving gear 2 meshes with a driving pinion 5 which is rigidly connected to a driving disk 6. This disk is constrained to rotate about a fixed axis by a peripheral bearing 7 and a thrust bearing 8, which are both mounted in a bearing cartridge 9 and this entire assembly fits closely in a cylindrically bored portion of the transmission case 10.

A compression spring 11, acting through a grooved cap 12 in which is fitted a short cylindrical roller 13, urges a loading beam 14 forward against the bearing cartridge 9. A cylindrical groove in the center of the loading beam 14 acts as a flexure pivot, so that the resultant force exerted on the bearing cartridge 9 may shift upward or downward automatically as needed. An adjustment screw 15 serves as one of the two fulcrums of the loading beam 14, permitting minor corrections to be made in the initial position of the plane of the face of the driving disk 6. The purpose of this loading system is to ensure that this plane remains perfectly parallel to the plane of the face of the driven disk 16, in order that equal normal force be applied to each of a group of balls 17 compressed between the two disks 6, 16.

The balls 17 are held in a cage 18 but are free to rotate with respect thereto. A thin peripheral bearing 19 allows the cage to rotate with respect to its supporting housing 20 about an axis lying substantially in the plane of the axes of disks 6 and 16. By means of a slotted hole 21 (see FIG. 2) in an extension of case 10 which has its sides parallel to the plane of the disk axes, the axis of cage 18 is enabled to be moved to various positions in the plane of the disk axis, to vary the speed ratio between the driven and driving disks 16 and 6. This movement is controlled externally by a handwheel 22 and leadscrew 23.

Driven disk 16 is supported on three trunnions 24 spaced more or less equally about its periphery, and by a thrust bearing 25. A small pinion 26 is rigidly connected to the rear of driven disk 16 and meshes with a large gear 27 which is in turn rigidly connected to the ring gear 28 of the epicyclic. The planetaries 29 of the epicyclic are mounted on a spider 30 which is rigidly connected to the output shaft 31.

FIG. 2 shows one method of mounting the cage 18 so as to ensure proper location of its axis in the plane of the disk axes. Machines designed to achieve utmost precision of output speeds, holding them to say one part in ten thousand, will generally use a very thin lubricant such as kerosene. In this case it becomes critical to insure that the cage axis is within a few thousandths of an inch of the plane of the disk axes. If it is not, lateral forces are developed on the cage 18 tending to move it toward the axis of the driving disk 6 (in the view shown downward). To avoid this it is desirable to provide a very firm support for both disks 6, 16 and cage 18, and if possible a type of support which tends to swing the cage 18 back into the proper plane in response to any lateral forces developing.

In the construction of FIG. 2, two small rollers 32 (or needle bearing cam-follower studs) are mounted adjacent to each other in cage support housing 20. As the sum of their diameters is slightly greater than the width of the slotted hole 21, they provide a preloaded type of support for the cage 18 and hence minimize deflection under load. In addition, the contact point between these two rollers 32 is slightly below (or above, depending on the sense of rotation of the driving disk 6) a line perpendicular to the plane of the disk axes through the center of the cage 18. The purpose of this is so that a slight clockwise (counterclockwise) angular rotation of the housing will cause the axis of the cage 18 to move rightward (leftward) a few thousandths of an inch. Such a rotation is possible because of a small amount of clearance between the threads of the lead screw 23 and the threaded upper elbow of the cage housing 20, and also to some extent as a result of some flexibility of the lead screw 23. The couple producing this slight rotation arises from downward forces acting on the cage 18 as a result of an improper position to the left of the plane of the disk axes, and an upward reaction thereto at the lead screw 23. An adjustment screw 33 and a movable guide plate 34 are also provided to enable the cage 18 to be located perfectly at the upper and lower extremes of its travel. In machines employed for general industrial use, adjustment screw 33 and movable guide plate 34 may be eliminated if reasonably precise manufacturing tolerances are maintained.

In FIG. 3, the mounting of the cage 18 in the cage support housing 20 is shown in detail. The contact area between the ball 17 and its seat 40 in the cage 18 may be widened from line contact by honing of the seat 40 and installation of the ball 17 in a chilled condition relative to the cage 18. In addition, prior to insertion of the ball 17, a groove 41 may be ground into the center of the seat to distribute lubricant evenly around the periphery of the ball 17. Lubricant is supplied to the cage by means of oil rings 42, which also serve to hold the cage 18 in position within the peripheral bearing 19. The outer surfaces of the oil rings 42 after being pressed into place are separated by a distance of a few thousandths of an inch less than the diameter of the balls 17, so that they rub lightly on the disks 6, 16 during operation. Since a film of oil adheres to the disks 6, 16, this creates a sort of oil trap or accumulator, whereby oil is steadily collected within the oil rings 42 due to the fact that the cage 18 runs several degrees hotter than the disks 6, 16 and thermal expansion of the oil after it enters the trap tends to cause the outflow to be slightly less than the inflow. An equilibrium point finally is reached wherein the space between the cage 18 and the surfaces of the disks 6, 16 is nearly full of oil.

FIG. 4 shows a modification of the construction of FIG. 1 whereby adjustments in the transmission speed ratio may be made when it is not running. In this arrangement all features are the same as in FIG. 1, except that a smaller driving disk 50 is used, mounted in a combined thrust and radial bearing 51 in a considerably shorter driving disk cartridge 52. Parallelism of the faces of the disks 50, 16, and consequently equal loading on all balls 17, is insured by applying the load through a shifting ball 53 constrained to remain coaxial with the cage 18 by employing a cage support housing 54 which extends around behind the driving disk cartridge 52. This shifting ball is constrained against lateral movement by cylindrical grooves 55, 56 in the back of the driving disk cartridge 52 and the front of the loading beam 57. The loading beam 57 is supported at three points, on two fulcrums 58, 59 at one end and a compression spring (part 260, FIG. 15) at the other.

Power is transmitted to the driving disk 50 by means of a belt 60 (shown rotated into view) and a pulley 61 attached to the outer diameter of the driving disk 50. Variations in the distance between the axis of the pulley 61 and the main axis of the transmission (1, FIG. 1) which occur during shifting of the driving disk cartridge 52, may if necessary be accommodated by an idler pulley (not shown).

Driving disk cartridge 52 is substantially square and is mounted to allow it to be moved normal to the axis of driven disk 16 by parallel ways 62 milled in the transmission housing 10. An elongated slot 63 allows the driving belt 60 to pass through one of these ways. A lead screw 64 has one set of threads engaging the driving disk cartridge 52 and controlling its position relative to the axis of the driven disk 16, and a thinner portion having twice as many threads per inch controlling the position of the cage support housing 54.

FIG. 5 shows still another method of mounting the driving disk cartridge 52. In this construction the axes of the driving disk 70 and the driven disk 16 are stationary, and the cage 18 shifts radially with respect to the input shaft 1. Power is transmitted to the driving disk 70 by a means which is especially applicable to systems having a plurality of driving disks 70 arranged symmetrically around the input shaft 1. This consists of a central friction wheel 71 which engages the driving disks 70 at their innermost point, with normal loading to insure traction being obtained through an elastic ring 72 which is snapped over and encompasses the driving disks 70.

Another feature shown in FIG. 5, which may be used in any construction where only the cage 18 shifts, is a pair of balls 73 which move with the cage 18. Since the position of these balls 73 is controlled by an extension of the cage support housing 74 carried around behind the driving disk cartridge 52, they always remain coaxial with the cage 18 and ensure equal loading of the balls 17. As in the case of FIG. 4, the balls 73, 73 are constrained to move only radially with respect to the input shaft 1 by means of cylindrical grooves 55, 56 in the back face of driving disk cartridge 52 and the front face of loading beam 57 respectively. Parallel ways 75 are milled into housing 10 to prevent tangential movement of the driving disk cartridge 52, which is of square section. The cage support housing 74 may be restrained to move only in such a way that the axis of the cage 18 remains in the plane of the axes of the disks 70, 16 by means of another set of parallel ways (not shown) or by the methods shown in FIGS. 2 or 14. To control the position of the cage support housing 74 a lead screw 76 may be provided, with the movement of the several lead screws being coordinated as in FIG. 6, or, alternatively the same function can be served by a single central control plate similar to the one shown in FIG. 8 but with spiral slots rather radial.

FIG. 6 shows an embodiment of the second type, wherein several small driving disks 80 cooperate to drive a large driven disk 81. In this particular construction the faces of the driving disks 80 are flat and the surface of the adjacent portion of the driven disk 81 is spherically dished, which is permissible without destroying the pure rolling action of the balls 17 if the cage 18 contains only a single ring of balls, or if different size balls are used in each of several concentric rings.

In FIG. 6 torque and/or angular rotation is applied to input shaft 82, which carries a disk driving gear 83 and a first planetary driving gear 84. The former drives a plurality of driving disks 80 symmetrically arranged around input shaft 82. Each of these driving disks 80 is mounted in the transmission case 85 by means of a radial bearing 86 and a thrust bearing 87. Rotation of the driving disks 80 causes the balls 17 to rotate in their seats in the cages 18, the cages 18 to rotate in their peripheral bearing 19, and the driven disk 81 to rotate about the main axis of the transmission. Traction is maintained because the driven disk 81 also serves the function of an elastic ring similar to that shown in FIG. 5. Because of its spherical inner surface it tends to center itself over each cage 18 and to follow along as the cages 18 are shifted.

By means of rollers 88 engaging slots 89 in output shroud 90, the rotation of driven disk 81 is transmitted to a second planetary driving gear 91. Together with the first planeary driving gear 84, this drives a set of planetaries 92 which are mounted on a spider 93 connected to the output shaft 94. Changes in speed ratio are effected by shifting of the cage support housings 95 along their supporting ways 96 by means of lead screws 97. The several lead screws 97 are coordinated by means of pulleys 98 connected by a bead-chain 99, so that the turning of any one lead screw 97 by a handwheel 100 positions all of them simultaneously.

Although a transmission similar to that of FIG. 6 can be constructed with input as well as output planetary gearing, as in FIG. 7, to obtain a drive that has a constant power capacity regardless of speed ratio setting, the construction illustrated is also a useful form since it has a constant output torque capacity. The speed range over which this constant torque output is available depends on the gear ratio of the output planetary, which may be either a differential, as shown, or an epicyclic, or if equal forward and reverse speeds are desired, may be omitted altogether. The same is true of FIG. 7.

FIGS. 7 and 8 show another form of transmission in which a number of small driving disks 101 symmetrically arranged around an input shaft 102 cooperate to drive large output disks 103. In this "three-path" construction input shaft 102 carries a first input planetary driving gear 104 and a second output planetary driving gear 105. The former, together with the second input planetary driving gear 106 drives a set of input planetaries 107, which are mounted in a spider 108 that constitutes the central portion of a jackshaft driving gear 109. This meshes with a jackshaft pinion 110 mounted on one end of a jackshaft 111 on the other end of which is a pulley 112. Jackshaft 111 is supported for rotation about its own axis by means of bearings 113 mounted in a frame 114 connected to the transmission case 115. A belt 116 connects pulley 112 to driving disk 101.

The rotation of driving disk 101 causes the balls 17 to rotate in their seats in the cage 18, which rotates in its peripheral bearing 19 and in turn rotates the driven disks 103. Traction is maintained by normal forces applied to the ring-shaped driven disk 103 by dish-shaped loading springs 118, which also serve to center the driven disks 103. Loading is accomplished by tightening up either of two collars 117 threaded to a central sleeve 119. Loading springs 118 are splined onto central sleeve 119 and cause it to rotate with the driven disks 103. This central sleeve 119 in turn drives the second input planetary driving gear 106 and the first output planetary driving gear 120. Gears 120 and 105 in turn drive a set of output planetaries 121, which are mounted in a spider 122 connected to the output shaft 123.

In this construction neither the driven disks 103 nor the cages 18, which are mounted in cage support plates 124, 137, are shiftable. Instead, changes in speed ratio are effected by shifting the driving disks 101 radially with respect to the main axis of the transmission. This is accomplished by turning handwheel 125 which rotates a small bevel pinion 126 (FIG. 8 only) meshed with a segment of gearing 127 attached to the rim of a central control plate 128. This control plate 128 has outwardly extending slots 129, which may be radial as shown or may be curved depending on the desired relation between speed increase and turns of the handwheel 125. Into each of these slots 129 projects a pin 130 pressed into a four-sided plate 131 connected to a triangular plate 132 by two short shafts 133 (FIG. 8 only) on which are also mounted spool-shaped trunnions 134 providing rotatable support for driving disk 101. A second pin 135 (FIG. 8 only) pressed into four-sided plate 131 fits into a slot 136 in the adjacent cage support plate 124 of the shape required to rotate the cage support plates 124, 137 slightly to keep the axis of the cage 18 in the plane of the axes of the driving disk 101 and the driven disk 103. Small square plates 138 connect the outer periphera of cage support plate 124 and 137 to cause plate 137 to follow the motion of plate 124, so as to keep the cages 18 on each side of driving disk 101 aligned.

FIG. 9 shows a construction which may be employed in a transmission of the type of FIG. 7 if it is desired to shift the cages 18 half as far as the driving disks 101, in order to obtain a multicage transmission in which the speed ratio may be adjusted when it is not operating. Radial movement of the cages 18 requires wider driven disks 140 than are employed in FIG. 7, which would ordinarily tend to be subject to toroidal twisting if supported only along one edge. FIG. 9, however, discloses a method of supporting a disk along two circumferential lines in such a way that it will remain flat as the cages 18 are moved radially outward. This is accomplished by interposing a compensating ring 141 between the driven disks 140 and their respective loading disks 142. These compensating rings 141 are divided into inner and outer portions by a circular groove 143 which produces a flexure pivot 144.

When load is applied to the cages 18 by tightening up one of the two collars 145 threaded onto central sleeve 119, the loading disks 142 are subjected to toroidal twist so that the portion adjacent to the ring-shaped outer fulcrum 146 of the compensating ring 141 tends to deflect further than the inner fulcrum 147. Under loading the inner portion of the compensating ring 141 is subjected to a clockwise toroidal twist (referring to section at upper left) and will deflect in that sense. Similarly the outer portion will be subjected to a counterclockwise deflection. But since the radial distance between the outer fulcrum 146 and its associated fulcrum 148 on the other side of the compensating ring 141 is less than that between the inner fulcrum 147 and its associated fulcrum 149, this tends to compensate for the toroidal twist of the loading disk 142. If the position of the fulcrums 146, 147, 148 and 149 bears the proper relation relative to the toroidal stiffness of the loading ring 142 and the two portions of the compensating ring 141, the face of driven disk 140 will remain plane regardless of changes in load or radial shifting of the cages 18.

Torque is transmitted from the driven disks 140 to the loading disks 142 through the compensating rings 141 by friction or through small dowel pins (not shown) pressed into centering rings 150, which also keep the compensating rings 141 and the driven disks 140 centered with respect to the central sleeve 119 and the input shaft 102 which passes through it. The loading disks 142 are splined onto the central sleeve 119. A lead screw 64 with both fine and coarse threads may be employed to shift the cage support housings 151 simultaneously as in FIG. 4, or central control plates (not shown but similar to that of FIG. 8 but with spiral slots) may be employed. Rotatable support for the driving disks 101, belt drive, and by-pass gearing would be similar to that of FIGS. 7, 8.

FIG. 10 shows still another useful construction for mounting a plurality of driving disks 160 cooperating to drive a large driven disk 161. As in FIGS. 7, 8, six or eight cages 18 may be used. Torque and/or angular rotation is applied to input shaft 162, which carries two driving pulleys 163 and second output planetary driving gear 164. By means of belts 165 encompassing one or two driving disk pulleys 166, driving disks 160, which are each mounted in a radial bearing 167 and a thrust bearing 168, are caused to rotate. Normal loading on the balls is provided by elastic deflection of the end of the transmission case 169, or if desired a disk spring (not shown) may be inserted between thrust bearings 168 and the transmission case 169.

Driving disks 160 mounted in the right hand half of the transmission are mounted similarly, but in an inner frame 170 which is tied to the transmission case 169 by means of a stationary central sleeve 171 and a threaded collar 172. Driven disk 161 is mounted for rotation on a small central bearing 173 and has attached to its outer periphera a shroud 174 which turns the first output planetary gear 175, the latter being mounted for free rotation on the input shaft 162. Gears 175 and 164 together drive a set of planetaries 176 mounted in a spider 177 attached to the output shaft 178.

Positioning of the cages 18 in order to alter the speed ratio is accomplished by means of the shifting mechanism shown in FIG. 11. This consists of two cage positioning spiders 179 dovetailed or splined to a central sleeve 180. The legs of each cage positioning spider 179 are connected by links 181 to one arm 182 of a Watt linkage, which with a second arm 183 supports the cage 18 for straight line motion in a direction radial to the central input shaft 162. Simultaneous positioning of all cages can be accomplished by positioning any one cage support housing 184 or the arm 183 attached thereto on the accessible (left-hand) side of the transmission, by means of a lead screw or lever (not shown) extending through the transmission case 169, as in FIG. 14.

It may be noted in connection with FIG. 11 that the type of cage positioning mechanism shown may be employed in any shrouded construction such as would occur for example in a transmission like that of FIG. 9 if it had been elected to connect the two loading disks 142 in that figure by means of an exterior shroud rather than an interior sleeve 119.

FIGS. 12 and 13 show two transmissions of the third type, wherein all disks are mounted on central shafts. As interference between these shafts and the cages 18 prevents these two drives from being run down to zero and reverse, they have been shown as having only step-up gearing on the input side and/or reduction gearing on the output side. This should not be taken to imply that for applications requiring only a narrow output speed variation, by-pass gearing such as shown in conjunction with the preceding embodiments may not be used to advantage.

In FIG. 12, torque and/or angular rotation is applied to input shaft 190, which carries input helical gear 191. This is meshed with input helical pinion 192 splined to driving disk shaft 193. Mounted on helical pinion 192 by means of a bearing 194 is a collar 195 at the top and bottom of which are pins 196 engaging a yoke at one end of an input loading beam 197, which has two fulcrums 198, 199 bearing against a portion of the transmission case 202. Depending on the direction of rotation of the input shaft 190, axial thrust exerted by helical pinion 192 in proportion to the torque it transmits acts through collar 195 to cause the input loading beam 197 to pivot about one fulcrum 198 or the other 199, so as to bear against a jack screw 203 threaded into an input loading lever 204, which is pivotally connected at one end to the transmission case 202 and slidably engages on its opposite face a tilting-pad thrust bearing 205. This bears against the outer face of the outermost of several driving disks 206, and applies force to maintain traction between disks 206 and balls 17, and between balls 17 and driven disks 207 which are sandwiched alternately between adjacent pairs of driving disks 206.

Like the driving disks 206, the driven disks 207 are also splined to a central shaft 208, which carries on the same splines the output helical pinion 209. This is meshed with the output helical gear 210, which drives the output shaft 211. As on the input side, proper location of fulcrums 200 and 201 enable a normal force to be imposed on the balls of the exact magnitude required to maintain traction regardless of the position of the cages 18. Except when a shock loading is applied at the output side of the transmission, normal loading is governed by the input torque, due to torque losses within the transmission, the output loading beam 212 being seated out on both fulcrums 200 and 201.

A nominal normal loading, to prevent scuffing between balls 17 and disks 206, 207 when the transmission is running with no torque load, is provided by a Belleville spring 213 interposed between the input loading beam 197 and the input loading lever 204. Also, a preloaded spiral spring 214 is attached to the input loading lever 204 and the jackscrew 203 tending to unscrew the latter to provide at each shutdown an automatic adjustment for wear, if any, of disks 206, 207 and balls 17 during the preceding run. Alternatively, parts 203, 213 and 214 can be placed between the output loading beam 212 and its associated loading lever 215 if desired.

Output speed is controlled by lateral shifting of the cages 18, which are mounted in a common carriage 216 that keeps them coaxial with each other and with the thrust pads 205, which shift with them. This carriage may be supported in parallel ways (not shown) or by the methods of FIGS. 2 or 14, and is shifted by means of a lead screw (not shown) extending across the top of the disks. Output shaft 211 and input shaft 190 may be made coaxial, if desired, by proper choice of diameters of the input and output helical gears sets, 209–210, 191–192.

FIG. 13 employs the same means of mounting the disks 206, 207 as in FIG. 12, threading them onto splined central shafts, but is able to employ a loading system similar to that of FIG. 9 because the cages 18 are symmetrically disposed with respect to the main central shaft 220. As all of the elements have been fully illustrated in preceding figures, this figure is drawn semi-schematically.

Torque and/or angular rotation are applied to input shaft 220, to which are splined driving disks 206, the outer of which are urged toward each other by loading disks 142, with compensating rings 141 interposed. At least two driven disk shafts 221 are rotatably mounted parallel to the input shaft 220 and at equal distances therefrom, and splined to these shafts 221 are driven disks 207, one on each shaft 221 between each pair of driving disks 206. Pinions 222 at the end of each of shafts 221 cooperate to drive a large output gear 223, which in turn drives the output shaft 224.

Cage carriages 225 are supported by the same means as for FIG. 12 and are positioned by lead screws (not shown) extending outside the transmission case 226. If only two driven shafts 221 are employed and are mounted in the same plane as the input shaft 220, a single lead screw passing entirely across the top of the interior of the transmission may be employed, provided it has right-hand threads to position one cage carriage 225 and lefthand threads to position the other. An alternative means of controlling two or more cage carriages simultaneously is obviously a central positioning plate similar to part 179 in FIG. 11 or part 128 in FIGS. 7, 8.

FIG. 14 shows a modified cage support and positioning system designed to accomplish the same function as that of FIG. 2. Cage 18 is mounted in a peripheral bearing 19 pressed into a cage support housing 230, with the center of the cage 18 lying on a line between two support pins 231. Cage support housing 230 thus comprises the central link of a watt straight line mechanism, with its ends pivotally connected to arms 232 and 233 which are also pivotally connected to the transmission case 10. An extension of one arm 233 has a slot 234 at one end, in which is a pin 235 attached to a dog 236 threaded onto a lead screw 237. Lead screw 237 extends through the transmission case 10 and may be turned by handwheel 22.

To accommodate both misalignment of the axis of cage 18 with respect to the plane of the disk axes and also deflection under load, narrow slots 238 are cut through the cage support housing 230 at a small angle to the line normal to the line of the disk centers. The effect of these slots 238 is to allow the lateral forces acting on the cage 18 due to misalignment to deflect it in a direction normal to the slots 238, which if the driving disk (not shown) rotates in the proper sense will return the axis of the cage 18 to a position substantially within the correct plane.

An overload protection device such as shown in FIG. 15 is not as important with the types of transmission illustrated as with other types of friction transmission, since the pure rolling action between balls and disks is less conducive to loss of traction. Furthermore, since nearly all of the internal power losses occur in the rubbing contact between the balls 17 and their seats in the cage 18, and these losses diminish as transmitted torque diminishes, the types of transmission herein disclosed tend to maintain a good efficiency even at part load. Hence torque-proportional normal loading such as provided in FIG. 12 is not critical either.

Most commonly the types of transmission shown herein will be rated conservatively, with sufficient margin of safety against loss of traction to carry with safety the high starting torques of many electric motors, of 250 percent of running torque. However in some cases where the need is for high power transmission capacity in the most compact device, the rating of the transmissions shown can be approximately doubled if the device of FIG. 15 is installed. It should be noted that it may be applied to any of the constructions shown, although the elements of it producing supplementary loading on loading beams or disks would not be applicable to FIGS. 6 and 12. Generally, the device should be installed on the input shaft of constant power transmissions and the output shaft of constant torque transmissions. A specific application to the former is illustrated in FIG. 15.

In an enlarged central portion 240 of input shaft 241 is milled at least one axial slot 242, in which is engaged a roller 243 rotatably mounted on the inner portion of a cylindrical sleeve 244. Sleeve 244 is free to slide axially, but is restrained from doing so by a preloading spring 245 which is compressed between sleeve 244 and a collar 246 held in place on the input shaft extension 247 by short screws 248 which also have bosses on their inner ends engaging a groove at the end of input shaft 241 to prevent its being withdrawn from the input shaft extension 247. At least one additional roller 249 is rotatably mounted in the end of input shaft extension 247 and projects into a T-slot 250 milled into sleeve 244. Around sleeve 244 is pressed a second thin sleeve 251 to provide a smooth surface for the oil seal 252 and needle bearing 253 interposed between it and the transmission case 254.

Torque applied to the input shaft 241 is transmitted to sleeve 244 by means of rollers 243. Sleeve 244 in turn transmits it to input shaft extension 247 by means of the T-slot 250, the side of which bears against additional roller 249. Because the sides of the T-slot 250 against which the additional roller 249 bears are flared outward, an axial force is produced tending to drive the sleeve 244 against the preloading spring 245. When the torque reaches such a magnitude that this axial force exceeds the preload of spring 245, sleeve 244 begins to move axially into the transmission case 254. When a small amount of this axial movement has occurred, a ring race 255 begins to bear against a pair of overload rollers 256 mounted in an overload ring 257, forcing it against an overload spring 258, and also, if desired, a limit switch (not shown). The other end of spring 258 is restrained by an overload sleeve 259 pressed into the end of loading beam 57, so that its compression is added to the force exerted by the ordinary loading beam spring 260.

The proportions of the T-slot 250 are such that just before the torque being applied to input shaft 241 reaches the point where the supplementary load on the loading beam 47 is in danger of damaging the disks or balls, the additional roller 249 slides into the circumferential portion of the T-slot 250 and simultaneously the roller 243 moves beyond the end of its slot 242 and begins to move around in the clearance space 261. This disengages input shaft 241 completely from input shaft extension 247. Sleeve 244 will remain in this disengaged position until the transmission is stopped and sleeve 244 is rotated back a few degrees relative to the shaft extension 247. This may be accomplished by holding the output shaft and turning the sleeve 244 by means of a spanner engaging slot 262, which will cause sleeve 244 to pop out into its normal running position.

FIGS. 16 through 24 disclose a number of constructions for the ball seats of the cage as alternatives to FIG. 3. Which of these constructions will provide the most satisfactory service at the least cost will depend on a variety of circumstances, such as lubricant supply and viscosity, speed of operation, range of speed ratios, etc. In any case, and particularly where the service conditions are severe, a well-constructed cage is essential.

Cages generally can be divided into two classes, the well-lubricated type and the sparsely lubricated type. The former (FIGS. 3, 16–21) are probably most suited to general service, the latter (FIGS. 22–24) to special applications requiring unusually high capacity or extreme accuracy of output speed control.

In FIG. 16 a ball 17 is shown housed in a pair of spherically ground bushings 270 of a suitable bearing material pressed into the cage 18 from opposite sides. A clearance space around the periphery of the ball is left, to provide a channel for distribution of the lubricant as it is carried into the spherical bushings 270 by rotation of the ball 17. The outer face of each bushing 270 rubs lightly on the surface of the adjacent disk, so that each ball 17 has its own oil trap functioning as described in the case of FIG. 3.

FIG. 17 discloses a simple cage construction of a particular utility in a construction such as FIG. 12, in which a large number of small balls 17 may be used because of the thrust pad type of loading. For most of the balls plain cylindrical holes 271 are bored in the cage 18, with considerable clearance (three or four thousandths of an inch) around each ball. The large clearance allows each ball to center itself in response to the high oil pressures produced in the converging wedge existing between the spherical ball surface and the cylindrical surface of its seat. If the thickness of the cage 18 is less than the diameter of the ball 17, in the construction of FIG. 17, the cage may be centered by providing three holes 272 at 120 degree spacing in the outer ring of balls which are half cylindrical and half spherical as shown. In between these three holes 272 are three others (not shown) of similar construction but faced toward the opposite disk. A high speed integral peripheral bearing 273 which can be used with this type of cage because the cage 18 can be made of hardened steel, is also shown. Use of a toroidal race in the cage 18 and a spherical race in the housing 274 allows the cage 18 and ball separator 275 to be inserted edgewise, then rotated 90 degrees, so that no filling notch is required.

FIG. 18 shows a modification to the bearing seat 271 in FIG. 17, comprising a cylindrical hole 280 bored at a small angle to the plane of the cage. In constructions in which the oil supply to the cage depends on wiping it off a particular disk, slanting the ball seats from a common center in a line normal to the cage axis on the same side as that disk will have the effect of causing the centrifugal forces acting on all the balls 17 to produce a component of force at each ball seat tending to urge the cage 18 against the disk. Such a construction may be used to advantage in conjunction with oil traps generally or oil wiping systems such as shown in FIG. 19, although it should be noted that in the absence of any tilting of the ball seats 280 such as shown in FIG. 18, the friction forces produced between the balls 17 and their seats in any cage 18 are in such a direction as to always urge the cage 18 lightly against the driven disk.

FIG. 19 shows a construction for the cage 18 that is intended to insure continuous lubrication for cages which always rotate in the same direction relative to a particular disk. A peripheral groove 281 is first ground into a cylindrical hole bored in the cage 18, which is made of bronze or other bearing material. The ball is inserted, then the material around the hole is subjected to a heavy pressure which swages it slightly around the ball to form two narrow spherical seats 282. Another feature shown in FIG. 19 which may be used in conjunction with other types of cage as well, is a scroll-shaped ridge 283 of square or rectangular section, which is raised above the face of the cage 18 and rubs lightly on the adjacent disk. Since the direction of the scroll is opposite to what it would be in a centrifugal pump, ridge 283 tends to transfer the oil it wipes off the disk towards a reservoir 284 at the center of the cage 18, from whence it passes through substantially radial holes 285 into the oil distributing grooves 281. It may be noted that in some cases a scroll-shaped ridge 283 may be located on both faces of the cage, the direction of this second scroll being determined by whether the cage velocity relative to the other disk is different or whether a torque reversal only is being accommodated.

FIG. 20 shows another form of cage designed to provide copious lubrication. The center of the cage 18 is hollow so as to form a large oil reservoir 290, the open side of which rubs lightly against a small driving disk such as shown in FIGS. 1, 4, 5, 6, or 10. The cage 18 is made fairly large so that the distance from its center to the ring of balls is approximately equal to half the radius of the driving disk. Hence the center of this disk is never crossed by the balls and a small central oil supply hole may be drilled clear through to the far end of the disk, where it communicates with an oil pump so that oil may be pumped directly into the center of the cage 18, from where it runs by centrifugal action through radial holes 291 into an oil distributing groove 292 between the two spherical bearing rings 293 which have been swaged around the ball 17.

It may be noted in connection with the cages disclosed herein that with the exception of FIGS. 17, 21 the balls 17 are closely held against tangential movement relative to each other. Consequently these cages must be provided with a self-correcting type of mounting such as shown in FIGS. 2 and 14 so they may move into the plane of the disk axes. An alternative to this type of mounting is to provide an elastic mounting for the balls within the cage, so that they may deflect relative to each other in the tangential direction. Deflection in the radial direction is to be avoided, but that in the tangential direction allows the balls to vary their velocity slightly as they move through their circular orbits which allows the cage center to be slightly displaced from the plane of the disk axes.

FIG. 21 discloses a cage that allows such a displacement. The balls 17 are held between two thin bearing shells 295 of a suitable bearing material, such as aluminum or bronze into which holes have been drilled and spherical seats formed by first stamping and if necessary also grinding. These shells 295 are held against an inner ring 296 and an outer ring 297 by an inner retaining ring 298, an inner retaining plate 299 and two outer retaining rings 300. This provides firm support for the ball 17 in the radial direction, but force applied to the ball 17 in the tangential direction causes the bearing shells to separate slightly due to the narrowness of the material between adjacent balls 17 thus providing the necessary tangential flexibility. It will be evident that if desired even greater tangential flexibility will be obtained if the shells 295 are held to one or both rings 297 and 296 by single rivets radially opposite each ball 17.

Although this type of tangentially flexible ball seat may be used in conjunction with many of the features disclosed in the other cages illustrated, it is shown in FIG. 21 as being supplied with lubricant through a positive central feed as in the case of FIG. 20. In this case a small rubbing ring 301 is shown, backed by a thin O-ring 302, to improve the oil storage characteristics of the central reservoir 303, from which radial holes 304 through the inner ring 296 provide oil to the ball seats. Another feature which can be used in connection with this type of internally resilient cage, but which is not shown because it is optional, is to introduce between each of the adjacent large balls 17 a small ball of nylon or other comparatively resilient material. If these balls are located on the line joining the centers of the large balls, they will always move in pure rolling and will serve to reduce somewhat the resiliency of the cage.

It is obvious that a cage designed to trap oil or wipe it from the surface of a disk must have a face adjacent to said disk which conforms to the surface against which it rubs. Such a cage in the case of FIG. 6, for example, would have to have one spherical face if it was intended to collect oil from the surface of the driven disk 81. The functioning of such a cage, however, would be substantially the same as that of the flat-faced cages illustrated heretofore.

FIGS. 22 and 23 show two cage constructions intended primarily for lubrication of the sparse type. In the first, FIG. 22, plastic wafers 310 of a soft dry-bearing material such as lead-filled Teflon are swaged around the balls 17 by means of metal plates 312 held together by rivets 313. An oil distribution groove 314 can also be provided if a central spacer 315 with oversize holes is employed.

FIG. 23 shows a ball 17 pressed into a cylindrical bushing 318 of soft plastic or other dry-bearing material, which has been previously pressed into the cage 18. This type of cage 18 will run rather hot until the balls 17 have worn themselves spherical seats.

FIG. 24 shows a construction intended for use with air bearings. In this construction both the cage peripheral bearing 319 and the ball seats 320 swaged around the ball 17 are made of a soft bearing material, such as lead-filled Teflon or babbitt, so that they tend to be ground to size during running in, after which air lubrication takes over, with air being supplied through a passage 321 in the cage support housing 322, entering a small chamber 323 in the center of the periphery of the cage 18. From this point it passes inward through a series of radial holes 324 in the cage 18 to a pressure distributing groove 325, and thence out around the balls 17. The two halves of the cage 18 may be held together by rivets 326. Generally the air used in this type of application should contain a light mist of oil vapor, to insure that the surfaces of balls 17 and disks are properly lubricated.

FIG. 25 shows a schematic diagram of a "two-path" transmission. This diagram would apply to FIGS. 1, 4, 5, 6 and 10, as shown, but it should be noted that if desired the transmissions shown in any of these figures could be made into "three-path" systems such as FIGS. 7 and 9 simply by installing input planetary gearing, along the lines indicated schematically in FIG. 26. (It should also be noted that the transmissions of FIGS. 7 and 9 completely follow the arrangement diagrammed in FIG. 26 only if it is considered that the lack of any reducing gear is equivalent to using gearing of unity ratio.) Similarly, any of the multiple-path transmissions could be made into single-path transmissions by elimination of the planetary gearing. It may also be noted that the term "planetary gearing" as used in this specification and the appended claims is intended to encompass both the epicyclic type of planetary gearing shown in FIG. 1 and the differential type of planetary gearing shown in FIGS. 6, 7, and 9, and regardless of whether the engagement is toothed, as shown, or frictional. Also, it may be noted that even more paths than three may be employed, if desired.

The general advantages of utilizing planetary gearing in conjunction with a multiple-ball transmission may be summarized as follows:

(1) The multiple-ball device is the only full range mechanical variable speed drive, which is to say that it is the only one with a range of speed ratios extending from minus infinity to plus infinity. Since no practical applications require such a wide range of speed ratios, in many cases it will be advantageous to carry only a fraction of the transmitted power through the variable speed channel (channel 2 in FIGS. 25, 26). A wide speed variation applied to this small fraction of the power produces, when it is recombined in a planetary gear set with the main stream of unvaried power, a much smaller variation at the output shaft, of whatever range may be needed. Since the torque imposed on the variable speed channel is also only a fraction of the total transmitted torque, it will be evident that the overall power capacity of the system will have been multiplied several fold.

(2) In the process of dividing out part of the power to be passed through the variable speed channel, the spur gearing, belts, friction wheels, or other means employed for this purpose can also serve to increase the speed of rotation. This enables a much larger amount of power to be handled by the variable speed channel than if it were directly coupled to an A.C. electric motor or other prime mover of limited output speed.

(3) If gearing of the proper ratio is employed, a system having a constant power capacity at all output speed ratios can be constructed. This is a most desirable characteristic for units intended for general purpose use, since they can be directly connected to a motor of a specified size and will function satisfactorily regardless of the nature of the load. For any multipath system, including those shown in FIGS. 25, 26, an equation may be developed relating the torque applied to the driving disk to the input torque to the entire system as a function of the distance of the cage axis from the axis of the driving disk. If certain conditions are met this equation will be a linear one, which means that for a given input torque the portion imposed on the driving disk will be exactly proportional to cage offset, and hence in exact proportion to the ability of the cage to carry torque. The conditions which must be met in the case of a two-path system, for example, are that the quotient of the reduction gearing ratio to the step-up gearing ratio must equal the planetary ratio minus one. In the construction of FIG. 1, it will be observed from the approximate proportions shown that these three ratios are nine, three and four, respectively, and hence the unit will have a constant power capacity throughout its entire range of output speeds.

(4) Although most well-constructed multiple-ball drives will have an efficiency close to that of conventional gearing, their employment in multipath systems insures that the over all efficiency will be substantially that of the gearing, between 96 and 98 percent.

Aside from the general advantages of multipath systems incorporating a multiple-ball variable speed channel (which do not apply to other variable speed devices because they lack a sufficient range of speed ratios), the special advantages of each of the main types of transmission shown may be summarized for purposes of comparison:

FIG. 1.—(1) Same gearing used to achieve constant power can also be used to give a low output speed such as is needed in most industrial applications.

(2) Easily geared to operate with any desired input speed or range of output speeds.

FIG. 4.—(1) Same advantages as FIG. 1, plus a construction allowing speed ratio to be changed when machine is not running.

(2) No adjustment after assembly to insure parallelism of disk faces.

FIG. 5.—(1) Same advantages as FIG. 1, plus no adjustment after assembly to insure parallelism of disk faces.

(2) Especially compact construction for three or four cage systems.

(3) Ring drive is cheaper and quieter than gearing.

FIG. 6.—(1) Exceptional efficiency due to elimination of thrust bearings on the driven disk and shifting of centrifugal loads on balls from cages to driven disk.

(2) No adjustment for disk face parallelism.

(3) Single path portion is constant torque basically, and addition of one planetary set gives a constant torque unit in any desired range, of two planetary sets a constant power unit.

(4) Compact, inexpensive construction for five- or six-cage units, since diversion of centrifugal effects allows faster operation with longer cage life.

(5) Easily geared for any input speed.

FIG. 7.—(1) Exceptional efficiency due to elimination of all thrust bearings.

(2) Compact construction for six- or eight-cage high-capacity unit.

(3) No adjustment for disk face parallelism.

FIG. 9.—(1) Same advantages as for FIG. 7, plus a construction allowing speed ratio to be changed when machine is not running.

FIG. 10.—(1) Good efficiency, due to elimination of one set of thrust bearings.

(2) Compact construction for six- or eight-cage high-capacity unit, particularly in radial dimensions.

FIG. 12.—(1) Compact, high-capacity units since cage may be fairly large.

(2) Carries high starting torques easily without special overload mechanism, due to large initial drag of thrust bearings.

(3) Fully resistant to shock loading imposed from either input or output end.

FIG. 13.—(1) Exceptional efficiency due to elimination of all thrust bearings.

(2) Simple, inexpensive construction for high-capacity units.

(3) Overall speed reduction.

It will be evident to one skilled in the art that the various novel features herein disclosed can be recombined in a variety of ways, such as employing by-pass gearing with the constructions of FIGS. 12, 13, or employing the cage of FIG. 21 in embodiments which otherwise show compliant support for the cage housing such as FIGS. 2 and 14, etc. Similarly, the principal of aggregation can frequently be used to advantage, for example, to widen the output speed range of machines such as shown in FIGS. 12, 13, by putting two in series, or, to make the speed ratio of the construction of FIG. 1 adjustable when the machine is not running by using two coaxial cages separated by an idler disk which shifts twice as far as the cages shift. Further, a construction such as shown in FIG. 5 may be utilized in a six- or eight-cage machine if a disk mounted as shown is provided for each cage, a driven disk mounted in trunnions is interposed between each pair of cages, and the power from the three or four driven disks is combined in a friction ring similar to that which retains the driving disks. In this case access to the inner cages must be through a spider such as shown in FIG. 11, since the ring encompassing the driven disks connects to the output gearing through a shroud as in FIG. 10.

It should also be noted that another obvious modification falling within the spirit of the invention is to hold one set of disks, or the cages, against rotating. This amounts simply to a superposing upon an entire construction a reverse rotation of such a magnitude as to bring to rest one element (or group of elements in a multicage system). An example in which this can quite readily be done is FIG. 6 where the elastic ring can be in effect frozen in place and the rest of the mechanism allowed to gyrate within it. For this reason the term "rotation" or "rotatably" as used in the claims should be construed in a relative sense, even where it is not specifically stated.

Since the multiple-ball type of transmission may be useful in many applications where exceptional compactness or capacity is not required, as few as one of the five capacity-improving provisions enumerated on the first page of this specification may be needed. Hence the invention is intended to be construed as comprising not only any combination of the disclosed improvements, but any one of them.

I claim:

1. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, and a third member constraining said rolling element to move in a circular path about an axis lying substantially in the plane of the axes of said first two members.

2. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, and a third member constraining said rolling element to move in a circular path about an axis lying substantially in the plane of the axes of said first two members, means to shift at least one of said three members to vary the position of its axis substantially within said plane of the axes of said first two members.

3. In a power transmission, a first rotatable member having at least one substantially smooth surface, all radial profiles of which move within said surface during the rotation of said member, a second rotatable member having its axis of rotation coplanar with the axis or rotation of said first member and having at least one substantially smooth surface containing a circle equidistant from said first surface, at least one rolling element frictionally engaged by said two surfaces, and a third member constraining said rolling element to move in a circular path about an axis lying substantially in the plane of the axes of said first two members, means to shift at least one of said three members to vary the position of its axis substantially within said plane of the axes of said first two members, and means mounting at least two of said three members for rotation with respect to each other and the third.

4. In a power transmission, a first rotatable member having at least one substantially smooth plane surface, a second rotatable member having its axis of rotation coplanar with the axis of rotation of said first member and having at least one substantially smooth spherical surface, at least one rolling element frictionally engaged by said two surfaces, and a third member mounting said rolling element for rotation about an axis contained in a plane normal to the plane of the axes of said first two members, means to shift at least one of said three members to vary the position of its axis substantially within said plane of the axes of said first two members.

5. In a power transmission, a first rotatable member having at least one substantially smooth plane surface, a second rotatable member having its axis of rotation coplanar with the axis of rotation of said first member and having at least one substantially smooth spherical surface, at least one rolling element frictionally engaged by said two surfaces, and a third member constraining said rolling element to move in a circular path about an axis lying substantially in the plane of the axes of said first two members.

6. In a power transmission, a first rotatable member having at least one substantially smooth plane surface, a second rotatable member having its axis of rotation coplanar with the axis of rotation of said first member and having at least one substantially smooth spherical surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, and means mounting at least two of said three members for rotation with respect to each other and the third.

7. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, means to shift at least one of said three members to vary the position of its axis substantially within said plane of the axes of said first two members, and means for applying rotational effort to one of said members, means for receiving rotational effort from another of said members, and planetary means operatively connected to said applying and receiving means.

8. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, a first planetary gear set, rotational effort from which is applied to one of said members, means for receiving rotational effort from another of said members, and a second planetary gear set to combine said rotational effort from both said second means and from said first planetary gear set.

9. The method of causing a mechanical tractive friction variable speed drive to be capable of functioning in a system for transmitting the same amount of power at all speed ratios, whereby rotary mechanical power is divided into two power transmission streams, one of which passes through said variable speed drive and is then recombined with the other stream in a set of planetary gears having proportions which result in the torque imposed on the variable speed drive being in exact proportion to its capacity to transmit torque, said variable speed drive comprising a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from the first surface, at least one rolling element frictionally engaged by said two surfaces, and a third member constraining said rolling element to move in a circular path about an axis lying substantially in the plane of the axes of said first two members, means to shift at least one of said three members to vary the position of its axis substantially within said plane of the axes of said first two members.

10. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, and means urging said first member toward said second member along a line coaxial with said third member.

11. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, means for applying rotational effort to one of said members, means for receiving rotational effort from another of said members, and planetary means operatively connected to said applying and receiving means, and means urging said first member toward said second member along a line coaxial with said third member.

12. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, a first planetary means, rotational effort from which is applied to one of said members, means for receiving rotational effort from another of said members, and a second planetary means to combine said rotational effort from both said second means and from said first planetary means and means urging said first member toward said second member along a line coaxial with said third member.

13. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, means urging said first member toward said second member along a line coaxial with said third member, comprising two levers each bearing against one fulcrum on a substantially rigid transmission case and a second fulcrum on an axially movable cartridge wherein said first member is rotatably mounted, a pivotal connection between said two levers, and a resilient element bearing against said pivotal connection.

14. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, means for applying rotational effort to one of said members, means for receiving rotational effort from another of said members, and planetary means to combine said rotational effort from said second means with other rotational effort, means urging said first member toward said second member along a line coaxial with said third member, comprising two levers each bearing against one fulcrum on a substantially rigid transmission case and a second fulcrum on an axially movable cartridge wherein said first member is rotatably mounted, a pivotal connection between said two levers, and a resilient element bearing against said pivotal connection.

15. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, means urging said first member toward said second member along a line coaxial with said third member, comprising at least one rolling element constrained to remain in line with the axis of said third member.

16. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, and means supporting said third member for rotation, said means being resilient in a direction making a small angle with said plane of the axes of said first two members.

17. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, and means mounting said rolling element within said third member for rotation with respect thereto, said means being resilient in a direction tangential to said circular path.

18. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, and means mounting said rolling element within said third member for rotation with respect thereto, said means being resilient in a direction tangential to said circular path due to deflection of said means normal to the plane of said circular path.

19. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, and shifting means to move two of said members within said plane of the axes of said first two members, said shifting means being adapted to move said members so that the distance from the axis of said third member to the axis of said first member is reduced at the same rate that the distance from the axis of said third member to the axis of said second member is increased, and vice versa.

20. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, means for applying rotational effort to one of said members, means for receiving rotational effort from another of said members, planetary means to combine said rotational effort from said receiving means with other rotational effort, and shifting means to move two of said members within said plane of the axes of said first two members, said shifting means being adapted to move said members so that the distance from the axis of said third member to the axis of said first member is reduced at the same rate that the distance from the axis of said third member to the axis of said second member is increased, and vice versa.

21. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, a first planetary means, rotational effort from which is applied to one of said members, means for receiving rotational effort from another of said members, a second planetary means to combine said rotational effort from both said receiving means and from said first planetary means with other rotational effort, and shifting means to move two of said members within said plane of the axes of said first two members, said shifting means being adapted to move said members so that the distance from the axis of said third member to the axis of said first member is reduced at the same rate that the distance from the axis of said third member to the axis of said second member is increased, and vice versa.

22. In a power transmission, a first structure comprising: a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, means to shift at least one of said three members to vary the position of its axis substantially within said plane of the axes of said first two members, means supporting each of said members, a second structure containing all the foregoing parts, and shifting means to simultaneously position corresponding members of both structures within the respective planes within each structure defined by the axes of said first member and said second member.

23. In a power transmission, a first structure comprising: a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, means supporting each of said members, a second structure containing all the foregoing parts, and shifting means to simultaneously position corresponding members of both structures within the respective planes within each structure defined by the axes of said first member and said second member comprising a rotatable plate engaging the means supporting said corresponding members.

24. In a power transmission, a first planetary system comprising a first gear, a planetary element operatively engaged therewith and with a second gear, a first means to apply rotational effort input to said first gear, a second means to transmit rotational effort from said planetary element to a variable speed drive, a third means to transmit rotational effort from the output of said variable speed drive to a first gear of a second planetary system, said second planetary system also including a planetary element operatively engaged with said first gear and with a second gear, a fourth means to operatively connect said first gear of said second planetary system with said second gear of said first planetary system, said second gear of said second planetary system being operatively connected to said first means, and a fifth means to transmit rotational effort output from said planetary element of said second planetary system.

25. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, means to shift at least one of said three members to vary the position of its axis substantially within said plane of the axes of said first two members, and frictional means to apply rotational effort to one of said three members.

26. In a power transmission, a first structure comprising: a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, means supporting each of said members, a second structure containing all the foregoing parts, and shifting means to simultaneously position corresponding members of both structures within the respective planes within each structure defined by the axes of said first member and said second member and frictional means to apply rotational effort to corresponding members in both structures comprising a central disk around which said corresponding members are symmetrically disposed and against which the inner edges of said corresponding members bear and a resilient ring encompassing said corresponding members and bearing against their outer edges.

27. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, means to shift at least one of said three members to vary the position of its axis substantially within said plane of the axes of said first two members, said first member being ring-shaped.

28. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, means to shift at least one of said three members to vary the position of its axis substantially within said plane of the axes of said first two members, said first member being ring-shaped and urging said rolling element against itself and against said second member by virtue of its own resilience.

29. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member constraining said rolling element to move in a circular path about an axis lying substantially in the plane of the axes of said first two members, means urging said first member toward said second member along a line coaxial with said third member, comprising an annular disk bearing against the surface of said first member opposite to said smooth surface, said bearing occurring along two circles at the inner and outer edges of said first member, said annular disk containing a narrow ring-shaped groove of a depth slightly less than the thickness of said annular disk, said annular disk also bearing against a heavy resilient disk on the side opposite to said first member along two circles of different diameters than said first two circles.

30. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, means urging said first member toward said second member along a line coaxial with said third member, comprising a thrust bearing engaging the side of said first member opposite to said smooth surface, said side also being smooth, said thrust bearing being urged against said side by a first lever pivotally mounted on an axis normal to the plane of the axes of said first and second members and intersecting the axis of said second member, said first lever also bearing against a second lever which in turn bears against the transmission case at two spaced-apart fulcrums, said second lever also being pivotally connected to a collar operatively connected to a means for applying rotational effort to said first member, said collar being urged against said second lever with a force proportional to said rotational effort.

31. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, means urging said first member toward said second member along a line coaxial with said third member, with a force proportional to the rotational effort applied to said power transmission in excess of a preset amount of rotational effort.

32. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, means to transmit rotational effort of said transmission, said means being adapted to disengage itself so as to cease transmitting said rotational effort when said rotational effort exceeds a preset amount.

33. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, means to transmit rotational effort of said transmission comprising a first shaft, a second shaft coaxial therewith and having its end adjacent to the end of said first shaft, a sleeve encompassing the ends of both said shafts and shiftable axially with respect thereto, an engagement between said first shaft and said sleeve comprising a pin carried by one extending into a first slot cut into the other, a second engagement between said second shaft and said sleeve comprising a pin carried by one extending into a second slot cut into the other, said second slot including a first portion tangentially directed with respect to said sleeve and a second portion having a face at an angle to said first portion, resilient means restraining said sleeve against axial movement with respect to said second shaft.

34. In a device to transmit power by movement of at least one tractive element frictionally engaging a driven element means to transmit rotational effort of said transmission comprising a first shaft, a second shaft coaxial therewith and having its end adjacent to the end of said first shaft, a sleeve encompassing the ends of both said shafts and shiftable axially with respect thereto, an engagement between said first shaft and said sleeve comprising a pin carried by one extending into a first slot cut into the other, a second engagement between said second shaft and said sleeve comprising a pin carried by one extending into a second slot cut into the other, said second slot including a first portion tangentially directed with respect to said sleeve and a second portion having a face at an angle to said first portion, said angle being in a helical direction with respect to said sleeve, resilient means restraining said sleeve against axial movement with respect to said second shaft and means to transmit axial force from said sleeve to apply normal load upon said tractive elements.

35. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, and means mounting said ball within said third member for rotation with respect thereto comprising a disk with a hole of substantially the same diameter as said ball, said hole containing a groove adjacent to the equator of said ball.

36. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, means mounting said ball within said third member for rotation with respect thereto and means carried by said third member surrounding said ball and slidably bearing against said first member.

37. In a power transmission, a first rotatable member having at least one substantially smooth surface, all radial profiles of which move within said surface during the rotation of said member a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, and means mounting said ball within said third member for rotation with respect thereto comprising a disk with a hole wherein is fixed at least one bushing having a spherical surface of radius substantially the same as said ball.

38. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, and means mounting said ball within said third member for rotation with respect thereto comprising a disk containing a cylindrical hole with axis normal to the plane of said circular path.

39. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, and means mounting said ball within said third member for rotation with respect thereto comprising a disk containing a cylindrical hole with axis inclined to the normal to the plane of said circular path.

40. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, and means mounting said ball within said third member for rotation with respect thereto comprising a disk containing a hole that for part of the thickness of said disk is cylindrical and for the remaining part is spherical.

41. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, means mounting said ball within said third member for rotation with respect thereto and outwardly extending vanes projecting from the face of said means slidably bearing against said first member.

42. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, means mounting said ball within said third member for rotation with respect thereto said means containing at least one annular recess for accumulating and distributing lubricant.

43. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, means mounting said ball within said third member for rotation with respect thereto, said means containing at least one annular recess for accumulating lubricant and distributing it through at least one substantially radial hole extending from said annular recess to a hole in said means housing said ball.

44. In a power transmission, a first rotatable member having at least one substantially smooth surface, all radial profiles of which move within said surface during the rotation of said member, a second rotatable member having its axis of rotation coplanar with the axis of rotation of said first member and haxing at least one substantially smooth surface containing a circle equidistant from said first surface, at least one ball frictionally engaged by said two surfaces, a third member constraining said ball to move in a circular path about an axis lying substantially in the plane of the axes of said first two members, and means mounting said ball within said third member for rotation with respect thereto comprising a journal formed around said ball by swaging of material adjacent to said ball.

45. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, and means mounting said ball within said third member for rotation with respect thereto comprising a disk of soft bearing material, a hole in said disk of substantially the same diameter as said ball, a pair of relatively rigid plates one on each side of said disk each having a hole coaxial with said hole in said disk, and means to attach said pair of plates together so as to slightly compress said disk.

46. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, and means mounting said ball within said third member for rotation with respect thereto comprising a disk with a hole wherein is fixed a bushing of substantially cylindrical interior surface.

47. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one ball frictionally engaged by said two surfaces, a third member constraining said ball to move in a circular path about an axis lying substantially in the plane of the axes of said first two members, and means mounting said ball within said third member for rotation with respect thereto comprising a pair of close-fitting spherical surfaces girdling the widest portion of said ball, with high-pressure fluid flowing inward through small holes extending generally inward in said third member from a groove peripherally extending around said third member.

48. In a power transmission including a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, and a third member mounting said rolling element for rotation about an axis contained in a plane normal to the plane of the axes of said first two members, means to shift at least one of said three members to vary the position of its axis substantially within said plane of the axes of said first two members, means for supporting said rolling element for high-speed rotation with respect to said third member on a film of high-pressure fluid.

49. In a power transmission including a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, a third member mounting said rolling element for rotation about an axis contained in a plane normal to the plane of the axes of said first two members, means to shift at least one of said three members to vary the position of its axis substantially within said plane of the axes of said first two members, means for supporting at least one of said members for high-speed rotation on a film of high-pressure fluid.

50. In a power transmission including a first rotatable member having at least one substantially smooth surface, all radial profiles of which move within said surface during the rotation of said member, a second rotatable member having its axis or rotation coplanar with the axis of rotation of said first member and having at least one substantially smooth surface containing a circle equidistant from said first surface, at least one rolling element frictionally engaged by said two surfaces, and a third member mounting said rolling element for rotation about an axis contained in a plane normal to the plane of the axes of said first two members, means to shift at least one of said three members to vary the position of its axis substantially within said plane of the axes of said first two members, means for supplying lubricant to said rolling element by interposing between it and said first member a means in contact with both adapted to remove some of the lubricant film adhering to said first member and transmit it to said rolling element.

51. In a power transmission, first and second members each having at least one substantially smooth surface of revolution, the axes of said surfaces of revolution lying in a common plane but not being parallel, at least one rolling element frictionally engaged by said two surfaces, a third member mounting said rolling element for rotation about an axis also lying in said plane, means to shift at least one of said three members to vary the position by parallel displacement of one of said axes within said plane, and means mounting at least two of said three members for rotation with respect to each other and the third.

52. In a power transmission, a first rotatable member having at least one substantially smooth surface, all radial profiles of which move within said surface during the rotation of said member, a second rotatable member having its axis of rotation coplanar with the axis of rotation of said first member and having at least one substantially smooth surface containing a circle equidistant from said first surface, at least one rolling element frictionally engaged by said two surfaces, and a third member constraining said rolling element to move in a circular path about an axis lying substantially in the plane of the axes of said first two members, a fourth rotatable member similar to said first rotatable member and mounted coaxial therewith, a fifth rotatable member similar to and coaxial with said third member and containing at least one rolling element frictionally engaged between said fourth member and said second member, and means holding together said first member and said fourth member, said means mounted to rotate with said first and said fourth members.

References Cited by the Examiner

UNITED STATES PATENTS

| | | | |
|---|---|---|---|
| 1,738,965 | 12/29 | Reina | 72—208 X |
| 1,814,165 | 7/31 | Jacobsen | 74—200 |
| 2,820,367 | 1/58 | Frantz et al. | 74—198 |
| 2,951,384 | 9/60 | Rouverol | 74—190 X |

FOREIGN PATENTS

| | | |
|---|---|---|
| 467,198 | 3/14 | France. |
| 997,276 | 9/51 | France. |
| 1,151,330 | 8/57 | France. |
| 306,740 | 4/55 | Switzerland. |

BROUGHTON G. DURHAM, *Primary Examiner.*

DON A. WAITE, *Examiner.*